(12) United States Patent  
Loprieno

(10) Patent No.: US 7,957,642 B2  
(45) Date of Patent: Jun. 7, 2011

(54) EFFICIENT AND SIMPLE BIT ERROR RATE CALCULATION ON OPTICAL TRANSPORT LAYER

(75) Inventor: Gilberto Loprieno, Milan (IT)

(73) Assignee: Cisco Technology, Inc., San Jose, CA (US)

(*) Notice: Subject to any disclaimer, the term of this patent is extended or adjusted under 35 U.S.C. 154(b) by 702 days.

(21) Appl. No.: 11/740,673

(22) Filed: Apr. 26, 2007

(65) Prior Publication Data

US 2008/0267622 A1 Oct. 30, 2008

(51) Int. Cl.
*H04B 10/08* (2006.01)

(52) U.S. Cl. ......... 398/27; 398/1; 398/6; 398/9; 398/25; 398/201; 398/212

(58) Field of Classification Search ................ 398/1–38, 398/201, 212; 370/216, 217, 221, 225, 441; 385/16

See application file for complete search history.

(56) References Cited

U.S. PATENT DOCUMENTS

| 6,549,542 | B1* | 4/2003 | Dong et al. .................. 370/441 |
| 6,925,219 | B2* | 8/2005 | Pfeiffer ........................... 385/16 |
| 2002/0109879 | A1* | 8/2002 | Wing So ....................... 359/118 |
| 2003/0030864 | A1* | 2/2003 | Charzinski .................... 359/118 |
| 2003/0226091 | A1* | 12/2003 | Platenberg et al. .......... 714/776 |
| 2004/0091273 | A1* | 5/2004 | Brissette et al. ............. 398/175 |
| 2005/0084262 | A1* | 4/2005 | Oberg et al. ................... 398/19 |
| 2005/0123294 | A1* | 6/2005 | Mascolo et al. ............... 398/19 |
| 2007/0104485 | A1* | 5/2007 | Zhang ............................. 398/69 |

* cited by examiner

*Primary Examiner* — Li Liu

(57) ABSTRACT

Transport network interfaces operate to transport for Optical Transport Unit frames over an Optical Transport Network. Besides FEC bits for the Optical Transport Unit frames, the transmitting transport network interface provides sequences of error-determining bits for the Optical Transport Unit frames sent on working and protection communications channels. There is at least one sequence for each Optical Transport Unit frame, the number of bits in the at least one sequence much smaller than the number of bits in the Optical Transport Unit frame. The receiving transport network interface determines the bit error rates for the working and protection channels from the sequences of error-determining bits without decoding said Forward Error Correction bits and can select the working and protection channels accordingly.

25 Claims, 5 Drawing Sheets

EFFICIENT AND SIMPLE BIT ERROR RATE CALCULATION ON OPTICAL TRANSPORT LAYER

BACKGROUND OF THE INVENTION

The present invention is related to optical networks, and more specifically, to the economic calculation of bit error rates (BER) for the transport frames of the emerging OTN (Optical Transport Network).

OTN (Optical Transport Network), the standards of which are defined by the ITU (International Telecommunications Union), represents an updating of the SONET/SDH networks with the WDM (Wavelength Division Multiplexing). Where SONET/SDH networks dealt with a single channel of optical signals over an optical fiber, OTN deals with the multiplicity of optical channels provided by the wavelength channels of WDM. OTN defines an optical transport hierarchy with enhanced operations, administration, maintenance, and provisioning (OAM&P) functions. Among the requirements is FEC (Forward Error Correction), by which data is encoded and decoded using a Reed-Solomon coding algorithm. FEC identifies errors in the optical signals transmitted through the network and corrects some of these errors.

Optical networks in general have back-up protection communications channels to provide alternative paths for the optical signals in case there is some fault in the working communications channel. A fault impedes the communications channel signals in some manner, e.g., the optical fiber carrying the operation communications channel might be cut or an element in the path of the communications channel might be experiencing difficulty. The optical signals are then switched from the original working channel to the protection channel. The switch might include a switch from one optical fiber to another.

To determine the amount of impediment on a communications channel, the bit error rate (BER) of the channel is used. The channel with the higher BER has the greater amount of impediment. In many networks the BERs of the working and protection channels are used to determine which channel is used as the working channel (and which is used as the protection channel).

In an OTN the data signals in a channel are protected by FEC which by its nature provides the BER of the network signals carried by the channel. The BERs of the communications channels can be used to select the working and protection channels. However, the FEC algorithm is complex and requires dedicated integrated circuits for optimum implementation and these integrated circuits are expensive. The costs for the FEC function alone may become quite high when the number of optical channels and fibers in an OTN is considered.

Thus the application of FEC should be considered judiciously and the present invention provides for a less expensive alternative to determine the BER of OTN signals.

DETAILED DESCRIPTION OF THE INVENTION

Figure 1:
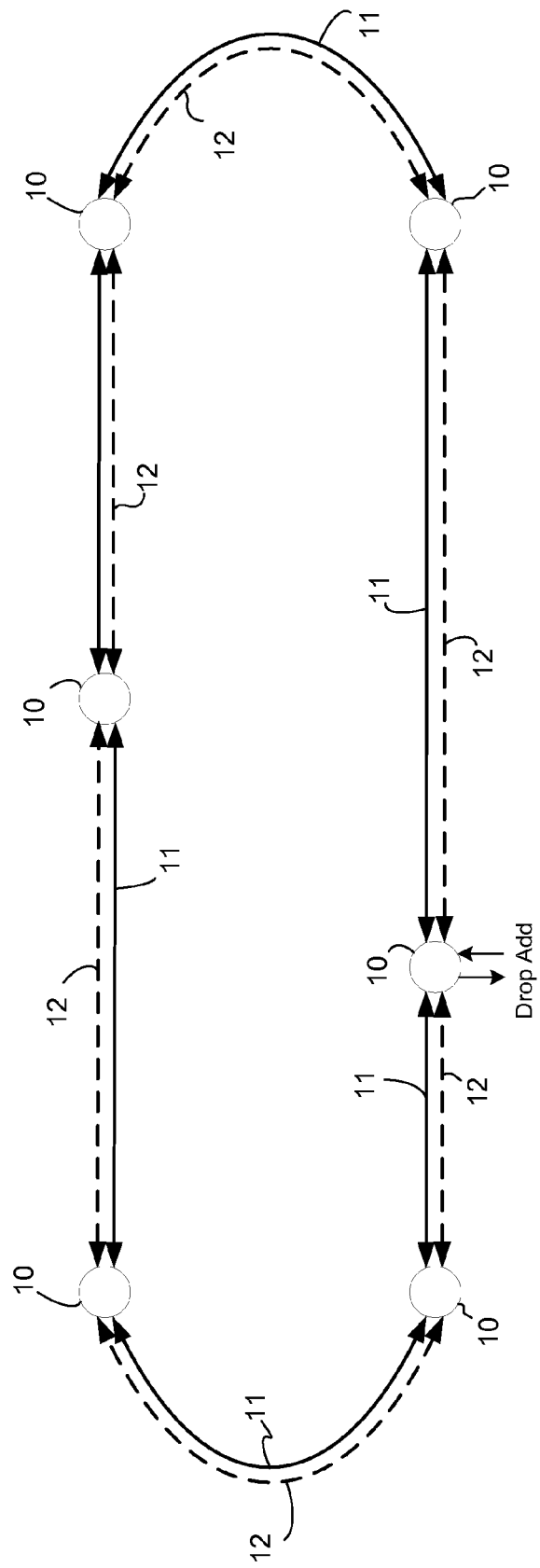
FIG. 1 is an example of an optical network with working and protection communications channels.

An overview of the present invention follows:

One aspect of the present invention provides for a method for operating a transport network interface to transport Optical Transport Unit frames over an Optical Transport Network. The method comprises encoding sequences of error-determining bits with simple logic circuits for the Optical Transport Unit frames which include Forward Error Correction bits, at least one sequence for each Optical Transport Unit frame, the number of bits in the sequence for each Optical Transport Unit frame much smaller than the number of bits in the Optical Transport Unit frame; and sending the Optical Transport Unit frames over the Optical Transport Network so that bit errors in the transmission of the Optical Transport Unit frames may be determined from the sequences of error-determining bits without decoding the Forward Error Correction bits.

Another aspect of the present invention offers a method for operating a transport network interface to transport Optical Transport Unit frames over an Optical Transport Network. The method comprising receiving the Optical Transport Unit frames over working and protection communications channels of the Optical Transport Network; and decoding sequences of error-determining bits from the Optical Transport Unit frames which include Forward Error Correction bits, at least one sequence for each Optical Transport Unit frame, the number of bits in the sequence much smaller than the number of bits in the Optical Transport Unit frame, to determine bit error rates for the working and protection channels without decoding the Forward Error Correction bits.

The present invention in another aspect provides for a transport network interface for transporting Optical Transport Unit frames over an Optical Transport Network. The transport interface comprises at least one integrated circuit having circuits adapted to encode Forward Error Correction bits for the Optical Transport Unit frames; and simple logic circuits connected to the Forward Error Correction encoding circuits adapted to encode sequences of error-determining bits into the Optical Transport Unit frames including the Forward Error Correction bits, at least one sequence for each Optical Transport Unit frame, the number of bits in the sequence for each Optical Transport Unit frame much smaller than the number of bits in the Optical Transport Unit frame before transport over the Optical Transport Network.

The present invention in still another aspect provides for a transport network interface for transporting Optical Transport Unit frames over an Optical Transport Network. The transport network interface comprises at least one integrated circuit adapted to receive the Optical Transport Unit frames over working and protection communications channels of the Optical Transport Network, the integrated circuit adapted to decode sequences of error-determining bits with simple logic circuits from the Optical Transport Unit frames in the working and protection communications channels, at least one sequence for each Optical Transport Unit frame, the number of bits in the sequence much smaller than the number of bits in the Optical Transport Unit frame, to determine bit error rates for the working and protection channels without decoding Forward Error Correction bits in the Optical Transport Unit frames; and circuits adapted to decode Forward Error Correction bits for each Optical Transport Unit frame in the working communications channel.

FIG. 1 is a representational and simplified optical network which illustrates the operation of working and protection optical channels. While the particular protocols and switching mechanisms for the working and protection channels are beyond the scope of the present invention, the description immediately below provides a context for the present invention.

In this example, the nodes 10 are arranged in a ring architecture for the sake of additional simplicity and ease of explanation. A mesh architecture would suffice equally. Each of the nodes 10 is connected to two other nodes 10 by two working channels 11 (indicated by a solid line) and two protection channels 12 (indicated by a dotted line). Since each line, whether solid or dotted, represents two optical channels, with each channel carrying optical signals in opposite directions, the line is terminated at each end by oppositely pointing arrows. Hence the channels 11 and 12 represent four channels between a pair of nodes 10.

It should be noted that the optical channels 11 and 12 might be optical fibers if the optical network operates under a protocol which defines optical channels as physical optical fibers. Assuming that the optical network operates under OTN protocols, the optical channels 11 and 12 are WDM communication channels which are defined by optical wavelengths. Furthermore, as used herein, node refers to a network location where a communication channel might be switched, particularly with regard to protection channels for faulty working channels.

As illustrated by one node 10, signals from a user are added to the network for transmission or dropped from the network for reception. The working channels 11 carry the optical signals between the nodes 10 of the optical network. The "stand-by" protection channels 12 become, in effect, the working fibers when the corresponding working channels 11 fail in some manner. As explained earlier, such failure can be complete, i.e., no signals are transmitted at all over the channels, or partial as measured by the rise of the BER of the working channels 11 above a predetermined value.

Figure 2:
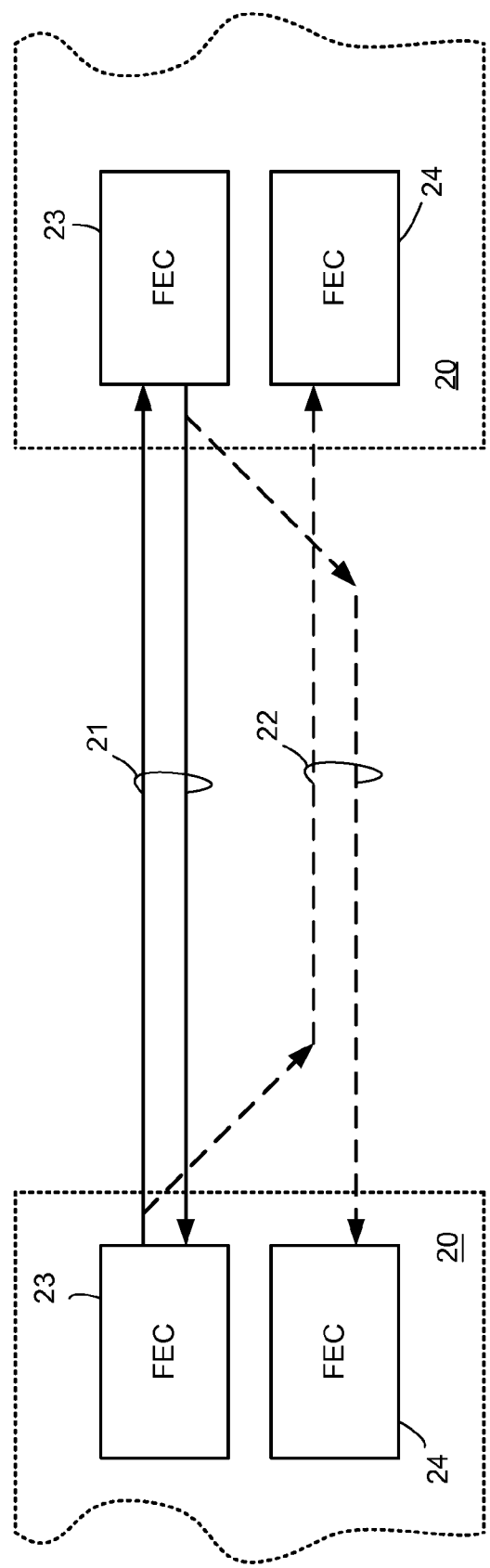
FIG. 2 is a block diagram of network interface cards using two FEC integrated circuits for FEC encoding and decoding on both working and protection communications channels.

For an OTN, the signals under transport are FEC (Forward Error Correction) encoded and decoded under the ITU G. 709 standard. FEC naturally yields the bit error rate (BER) of the transported data. FIG. 2 illustrates an implementation to use the BER determined from the FEC of OTN transported data to determine the working channels 21 and protection channels 22. Network interface cards 20 are connected to each other across an OTN including the working and protection channels 21 and 22. In this implementation each network interface card 20 holds two FEC integrated circuits 23 and 24. Other components of a network interface card which are not particular relevant to the present invention are not shown.

For the network interface card 20 transmitting the data across the network, only one FEC integrated circuit 23 is needed. The integrated circuit 23 encodes the data in accordance with the G. 709 algorithm and the encoded data is split for transport by the working channel 21 and the protection channel 22. The network interface card 20 receiving the transported data uses two FEC integrated circuits, one integrated circuit 23 to decode the data over the working channel 21 and the second integrated circuit 24 to decode the data over the protection channel 22. The BERs of the two data streams in the working and protection channels are used to subsequently select the working and protection channels.

But as mentioned above, the FEC integrated circuit 23 and 24 which handle the complex FEC algorithm for the Reed-Solomon code under the G. 709 standard are expensive. As shown in FIG. 2, each network interface card 20 requires two such FEC integrated circuits 23 and 24 to process the two bit streams of the working and protection channels 21 and 22.

To avoid the costs of these FEC integrated circuits, the present invention in one aspect provides for an economic way to determine the BER of an OTN bit stream. FEC is used only on the working optical channels as required under OTN; the protection channels use the alternative way of determining the BER. The BER may be calculated before FEC decoding on the working and protection channels and only the working channel requires FEC to decode (and correct if any errors in) the payload bytes in the OTN frame.

Figure 3A:
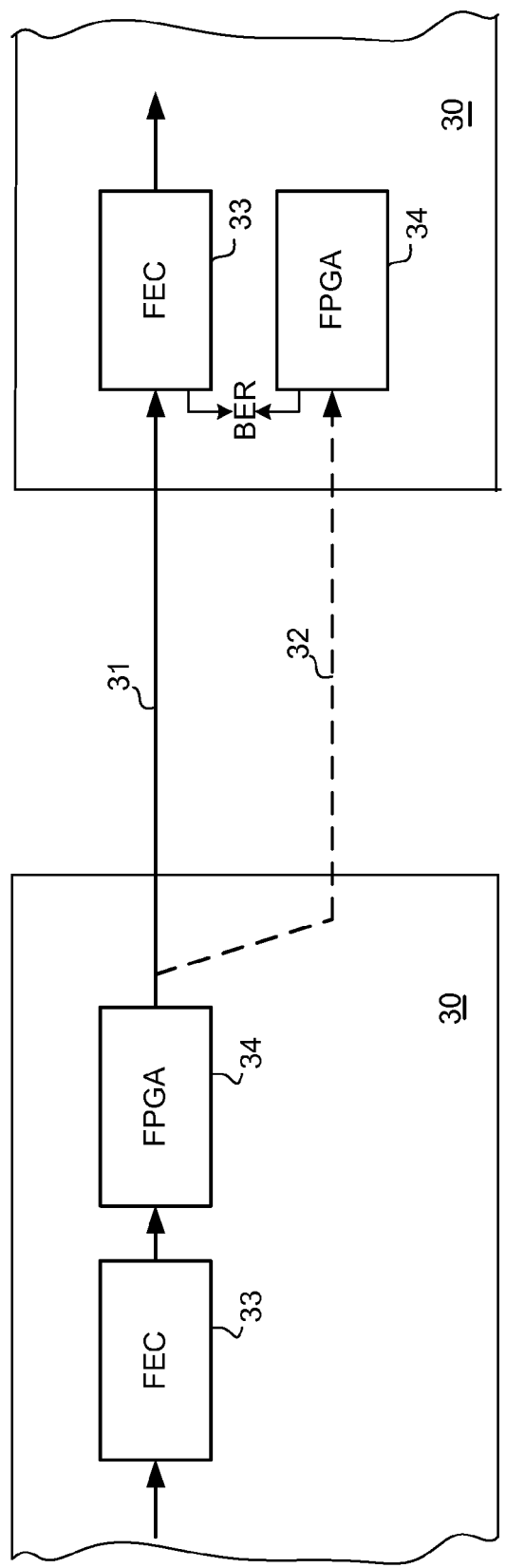
FIG. 3A is a block diagram of network interface cards with one FEC integrated circuit, according to one embodiment of the present invention.

FIG. 3A illustrates how an example network interface card might be arranged according to one embodiment of the present invention. In this example, two network interface cards 30, each have one FEC integrated circuit 33 and one FPGA (Field Programmable Gate Array) integrated circuit 34, illustrate the transmission of data from a left to right direction. Note how the FEC integrated circuit 33 and the FPGA integrated circuit 34 are arranged serially for the transmission of data as illustrated in the left network interface card 30 and how the FEC integrated circuit 33 and the FPGA integrated circuit 34 are arranged in parallel for the reception of data as illustrated in the right network interface card 30. The particularities in changing data paths for the two integrated circuits 33 and 34 for different functions operations is an easy task in electronic design and no further description is made.

In the left network interface card 30 which prepares data for transport across the OTN, the FEC integrated circuit 33 encodes the data is encoded according to the G. 709 standard. Then the FPGA integrated circuit 34 calculates and inserts one or more short error-detecting sequences of bits in the OTN frames which transport data across the OTN. The total number N of error-detecting bits for each OTN frame is small compared to the number M of bits in the OTN frame. For example, in one embodiment N is 32 and M is over 130,000. The circuit mechanism in encoding and decoding the error-detecting sequences of bits is simple.

The transported data is split into two and the data is carried over a working channel 31 and a protection channel 32. In accordance with the G. 709 standard, the FEC integrated circuit 33 in the right network interface card 30 receives the data in the working channel 31 and decodes the data from the OTN frame and passes the data on. On the other hand, the data in the protection channel 32 is received by the FPGA integrated circuit 34 in the right network interface card 30 which determines the BER in the data stream of the protection channel 32 from the error-detecting sequence of bits extracted from the OTN frames. The FPGA integrated circuit 34 holds simple logic circuits, i.e., for detecting errors from the error-detecting sequences of bits in the OTN frames. The BERs in working and protection channels 31 and 32 are compared to ensure that the channel with the lower BER is the working channel so that the data in that channel is FEC-decoded.

Figure 3B:
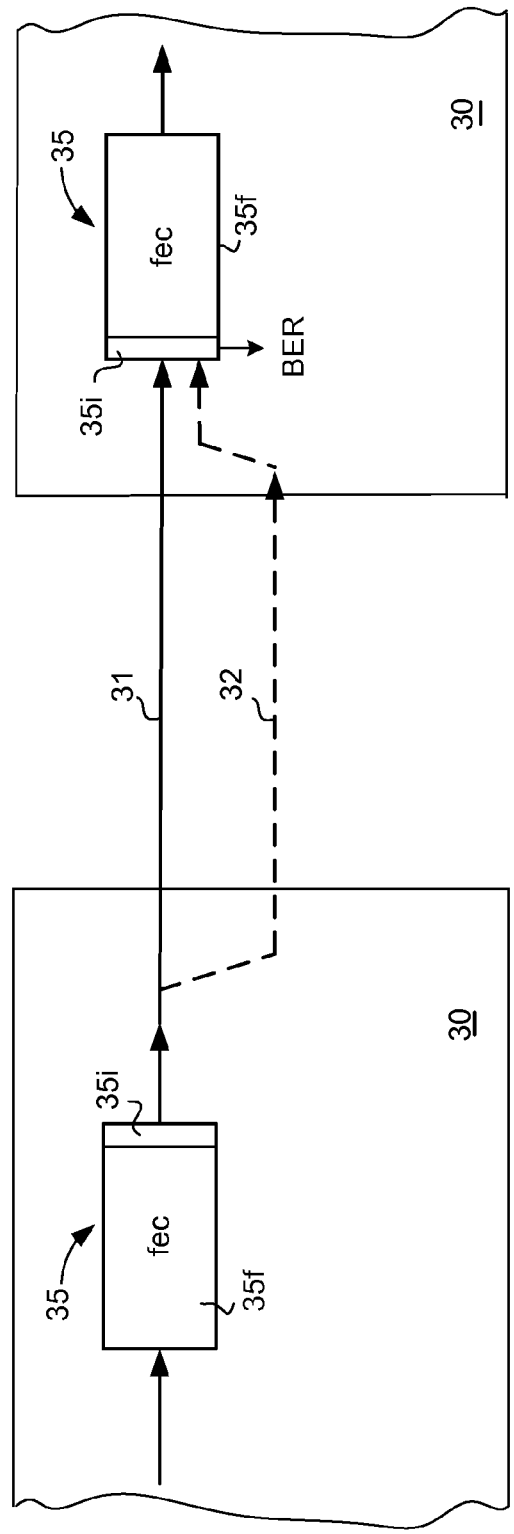
FIG. 3B is a block diagram of network interface cards with an ASIC with FEC, according to another embodiment of the present invention.

FIG. 3B illustrates an alternative arrangement for the network interface cards 30. Rather than separate dedicated FEC integrated circuits 33 and FPGA integrated circuits 34, the network interface cards 30 have an ASIC (Application Specific Integrated Circuit) 35 which is an integrated circuit customized to a user's application. The ASICs 35 each hold an FEC portion 35$f$ for the FEC functions and labeled "fec," and a logic interface portion 35$i$ for the error-detecting functions. The logic interface portion 35i does not tax the considerable requirements for the FEC portion 35$f$ since the logic required for the encoding and decoding of the error-detecting bit sequences is simple. Also part of the logic interface portion 35*i* are some path-switching circuits.

As illustrated by the network interface card 30 on the left, the logic interface portion 35*i* receives the FEC-encoded OTN frames from the fec portion 35*f*, inserts the error-detecting bit sequences into the OTN frames and outputs the OTN frames for transmission. In a similar manner as shown in FIG. 3A, the OTN frames are split into the working and protection channels 31 and 32. Alternatively, the logic interface portion 35*i* itself can be designed to split the output transmission for the working and protection channels 31 and 32.

In receiving frames from the transport network, the logic interface portion 35*i* of the ASIC 35 has two input terminals, as shown by the network interface card 30 on the right of FIG. 3B. With simple logic circuits, the logic interface portion 35*i* determines the BER of both working and protection channels while passing on the OTN frames of only the working channel to the fec portion 35*f* for decoding.

Preferably the error detecting sequence of bits is a BIP-8 (Bit Interleaved Parity 8) byte for each of the OTN frames being transported to the receiving network interface card 30. Each bit of the BIP-8 byte corresponds to even parity as calculated across matching bit positions for all the bytes in the OTN frame, i.e., the first BIP-8 bit corresponds to even parity across bit number 1 of the bytes in the OTN frame. Of course, an odd parity can also be used.

Figure 4A:
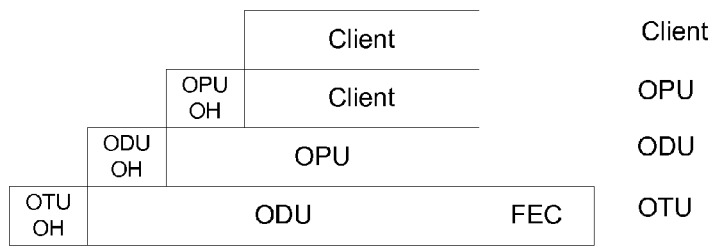
FIG. 4A is a representation of the overhead hierarchy in transporting client data across an OTN.

To fully appreciate the understand the described BIP-8 byte, it is helpful to understand the layer hierarchy of OTN. FIG. 4A is a representation of how the client data is progressively layered with various overhead sections to create an OTU (Optical Transport Unit) whose frame is sent across the fibers of an OTN. First, the actual data payload of a user, the client data, is headed by an Optical channel Payload Unit (OPU) overhead (OH) to form an OPU (Optical channel Payload Unit). The OPU is then headed by another header, the Optical channel Data Unit overhead (OH), to form an ODU (Optical channel Data Unit). To the ODU is added still another header, the OTU OH, and the FEC encoding data at the end of the ODU to form the Optical Transport Unit (OTU).

Figure 4B:
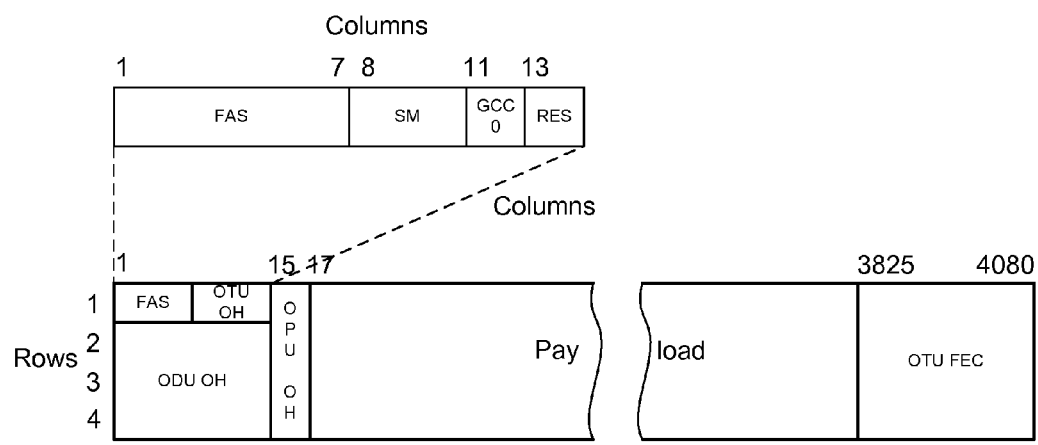
FIG. 4B is a representation of an OTN frame and location of the BIP-8 byte according to one embodiment of the present invention.

The organization of the OTU frame, a 4×4080 byte frame, is shown by FIG. 4B. The first row of bytes of the OTU frame starts with seven Frame Alignment Signal (FAS) bytes which are followed by seven OTU overhead bytes, byte columns 8-14. The first three bytes in the OTU OH are for Section Monitoring (SM), the next two bytes serve as a communication channel between OTU termination points, termed General Communication Channel 0 (GCC0), but the last two bytes, byte columns 13 and 14, are reserved (RES) for future use. The present invention uses one of these byte locations for a BIP (Bit Interleaved Parity)-8 byte. This byte is computed over the entire OTU frame including the FEC bytes, and inserted into the described reserved OTU OH location of a following OTU frame. Thus the BIP-8 byte for an OTU frame, termed herein as the OTUBIP-8, is sent and received one frame later after the subject OTU frame, i.e., the OTUBIP-8 for one OTU frame is in the subsequent OTU frame.

The OTUBIP-8 byte detects up to eight errors in the OTU frame using an even parity checking method. It should be distinguished from the BIP-8 byte located in the SM (Section Monitoring) bytes of the OTU OH. This BIP-8 byte is computed over the whole of the OPU (Optical Payload Unit), not the OTU frame which is the data transmitted over the OTN channels. Thus as extracted from received OTU frames, the OTUBIP-8 bytes provide a running account of the bit error rate of the data being transported over the protected channels 32. Parity checking requires only simple XOR (Exclusive-OR) logic circuits so relatively inexpensive FPGA integrated circuit can be used for creating the BIP-8 bytes and for determining the BER from the bytes. Dedicated integrated circuits can also be easily designed for BIP-8 operations.

Instead of a BIP-8 (Bit Interleaved Parity 8) byte for each of the OTN frames being transported, the error-detecting sequence of bits can be a BIP-8 byte for each of the 4080-byte rows in an OTN frame (see FIG. 4B). This BIP-8 byte can be placed in different byte locations of the particular row of the subject OTN frame. In the first row of the OTN frame, the BIP-8 byte may be placed in the $13^{th}$ or $14^{th}$ column positions. As explained earlier, these locations are reserved. The locations are now used for detecting errors in the row, rather than for the entire frame. In the second row, the first, second and third column positions are reserved and may be used for the BIP-8 byte for that row. For the third row, the $13^{th}$ and $14^{th}$ column positions may be used since they have been set aside for experimental use. And, in the fourth row, columns 9-14 positions may be used. Additionally, for the first three rows of the OTN frame, the $15^{th}$ column positions, which are part of the Optical Payload Unit (OPU) within the OTN frame, might also be used. This column positions are reserved, though they might be potentially used for Virtual Concatenation. This BIP-8 byte for each row check provides for a more accurate BER determination than the previously described BIP-8 byte for the entire OTN frame.

Alternatively, a less accurate BER determination can be provided with BIP-4 bytes, or a more accurate BER determination provided with Bit Interleaving Parity on a much large number of bits, say 1000, (but still much smaller than the total number of bits in an OTN frame. Furthermore, Bit Interleaved Parity need not be used for the error-detecting sequences of bits. For example, CRC (Cyclic Redundancy Code) can be used to create a checksum for the OTN frame, or for portions of the frame, such as each row, as described above with respect to BIP-8. Different degrees of generator polynomials can be selected for the desired degree of BER accuracy.

But in all these different embodiment of the present invention, simple logic circuits are used for encoding and decoding the error-detecting sequences of bits. For BIP and CRC operations, XOR (Exclusive-OR) logic circuits which require relatively few transistors and connections are used.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. A method comprising:
   forward error correction encoding an Optical Transport Unit frame to generate Forward Error Correction bits that are appended to the end of said Optical Transport Unit frame;
   encoding a sequence of error-determining bits with logic circuits for said Optical Transport Unit frame including said Forward Error Correction bits of said Optical Transport Unit frame, wherein the number of bits in said sequence of error-determining bits is smaller than the number of bits in said Optical Transport Unit frame;
   sending said Optical Transport Unit frame over an Optical Transport Network;
   inserting said encoded sequence of error-determining bits in a subsequent Optical Transport Unit frame; and
   sending said subsequent Optical Transport Unit frame over said Optical Transport Network so that bit errors in the transmission of said Optical Transport Unit frame are determined from said sequence of error-determining bits without decoding Forward Error Correction bits.

2. The method of claim 1, wherein sending said subsequent Optical Transport Unit frame comprises sending said subsequent Optical Transport Unit frame over a protection communications channel of said Optical Transport Network so that bit error rates for said protection communications channel is determined from said sequences of error-determining bits.

3. The method of claim 1, wherein encoding said sequence of error-determining bits comprises encoding a Bit Interleaved Parity byte for each Optical Transport Unit frame.

4. The method of claim 1, wherein encoding said sequence of error-determining bits comprises writing a Bit Interleaved Parity byte into an Optical Transport Unit Overhead section of said subsequent Optical Transport Unit frame.

5. The method of claim 1, wherein said sequence of error-determining bits comprises a Bit Interleaved Parity byte for said at least portion comprising each row of bytes of said Optical Transport Unit frame including Forward Error Correction bits associated with a corresponding row.

6. The method of claim 1, wherein encoding said sequence of error-determining bits comprises computing a checksum for each Optical Transport Unit frame.

7. A method comprising:
receiving Optical Transport Unit frames over a protection communications channel of an Optical Transport Network, wherein said Optical Transport Unit frames comprise sequences of error-determining bits that are stored in predetermined sections of said Optical Transport Unit frames;
decoding said sequences of error-determining bits from subsequently received Optical Transport Unit frames for previously received Optical Transport frames, wherein the number of bits in said sequences of error-determining bits is smaller than the number of bits in said Optical Transport Unit frames, and wherein said sequences of error-determining bits are determined from said associated Optical Transport Unit frames including Forward Error Correction bits; and
determining bit error rates associated with said protection channel from said decoded sequences of error-determining bits without decoding Forward Error Correction bits.

8. The method of claim 7, wherein decoding comprises decoding said sequences of error-determining bits with logic circuits.

9. The method of claim 7, further comprising:
receiving said Optical Transport Unit frames over a working communications channel of said Optical Transport Network;
determining bit error rates associated with said working communications channel; and
selecting said working and protection communications channels based on said determined bit error rates.

10. The method of claim 7, wherein said sequences of error-determining bits comprise one or more Bit Interleaved Parity bytes for each Optical Transport Unit frame.

11. The method of claim 10, wherein decoding comprises reading said one or more Bit Interleaved Parity bytes from said predetermined sections comprising Optical Transport Unit Overhead sections of said subsequently received Optical Transport Unit frames.

12. The method of claim 7, wherein said sequences of error-determining bits comprise a checksum for each Optical Transport Unit frame.

13. An apparatus comprising:
at least one integrated circuit having circuits configured to encode Forward Error Correction bits for Optical Transport Unit frames; and
logic circuits connected to said circuits on said at least one integrated circuit and configured to:
calculate sequences of error-determining bits for said Optical Transport Unit frames including said Forward Error Correction bits, wherein the number of bits in said sequences of error-determining bits is smaller than the number of bits in said associated Optical Transport Unit frame before transport over an Optical Transport Network;
insert said sequences of error-determining bits into Optical Transport Unit frames to be subsequently transmitted for previously transmitted Optical Transport Unit frames such that bit errors in the transmission of said Optical Transport Unit frames are determined from said sequences of error-determining bits without decoding Forward Error Correction bits.

14. The apparatus of claim 13, wherein said at least one integrated circuit comprises said logic circuits.

15. The apparatus of claim 13, wherein said logic circuits are configured to encode said sequences of error-determining bits comprising a Bit Interleaved Parity byte for each corresponding Optical Transport Unit frame.

16. The apparatus of claim 13, wherein said logic circuits are configured to write said sequences of error-determining bits comprising a Bit Interleaved Parity byte into an Optical Transport Unit Overhead section of a subsequent Optical Transport Unit frame.

17. The apparatus of claim 13, wherein said logic circuits are configured to encode said sequences of error-determining bits comprising a checksum for each Optical Transport Unit frame.

18. An apparatus comprising:
at least one integrated circuit configured to:
receive Optical Transport Unit frames over protection communications channel of an Optical Transport Network, wherein said Optical Transport Unit frames comprise sequences of error-determining bits that are stored in predetermined sections of said Optical Transport Unit frames;
decode said sequences of error-determining bits from said Optical Transport Unit frames, wherein at least one sequence of error-determining bits is associated with each Optical Transport Unit frame and carried in a subsequently received Optical Transport Unit frame, wherein the number of bits in said at least one sequence of error-determining bits is smaller than the number of bits in said associated Optical Transport Unit frame, and wherein said at least one sequence error-determining bits is determined from said associated Optical Transport Unit frame including Forward Error Correction bits; and
determine bit error rates for said protection channel using said sequences of error-determining bits without decoding said Forward Error Correction bits in said Optical Transport Unit frames.

19. The apparatus of claim 18, wherein said at least one integrated circuit comprises logic circuits configured to decode said sequences of error-determining bits from said Optical Transport Unit frames in said protection communications channel.

20. The apparatus of claim 18, wherein said at least one integrated circuit is further configured to:
  receive said Optical Transport Unit frames over a working communications channel of said Optical Transport Network;
  determine bit error rates for said working communications channel; and
  select said working and protection communications channels based on said determined bit error rates.

21. The apparatus of claim 18, wherein said at least one integrated circuit is configured to decode said at least one sequence of error-determining bits comprising a Bit Interleaved Parity byte for each Optical Transport Unit frame.

22. The apparatus of claim 21, wherein said at least one integrated circuit is configured to decode said at least one sequence of error-determining bits comprising said Bit Interleaved Parity byte from an Optical Transport Unit Overhead section of a subsequent Optical Transport Unit frame.

23. The apparatus of claim 18, wherein said at least one integrated circuit is configured to decode said at least one sequence of bits comprising a checksum for each Optical Transport Unit frame.

24. An apparatus comprising:
  means for encoding sequences of error-determining bits with logic circuits for Optical Transport Unit frames, wherein at least one sequence of error-determining bits is associated with each Optical Transport Unit frame, wherein the number of bits in said at least one sequence of error-determining bits associated with each Optical Transport Unit frame is smaller than the number of bits in said Optical Transport Unit frame, and wherein said at least one sequence of error-determining bits is determined from said Optical Transport Unit frame including Forward Error Correction bits;
  means for sending said Optical Transport Unit frames over an Optical Transport Network;
  means for inserting said encoded sequences of error-determining bits in subsequent Optical Transport Unit frames; and
  means for sending said subsequent Optical Transport Unit frames over said Optical Transport Network so that bit errors in the transmission of said Optical Transport Unit frames are determined from said sequences of error-determining bits without decoding Forward Error Correction bits.

25. An apparatus comprising:
  means for receiving Optical Transport Unit frames over a protection communications channel of an Optical Transport Network, wherein said Optical Transport Unit frames comprise sequences of error-determining bits that are stored in predetermined sections of said Optical Transport Unit frames; and
  means for decoding said sequences of error-determining bits from said Optical Transport Unit frames, wherein at least one sequence is associated with each Optical Transport Unit frame and carried in a subsequently received Optical Transport Unit frame, wherein the number of bits in said at least one sequence is smaller than the number of bits in said Optical Transport Unit frame, and wherein said at least one sequence of error-determining bits is determined from said associated Optical Transport Unit frame including Forward Error Correction bits; and
  means for determining bit error rates for said protection channel from said decoded sequences of error-determining bits without decoding Forward Error Correction bits.

* * * * *